Patented Jan. 8, 1929.

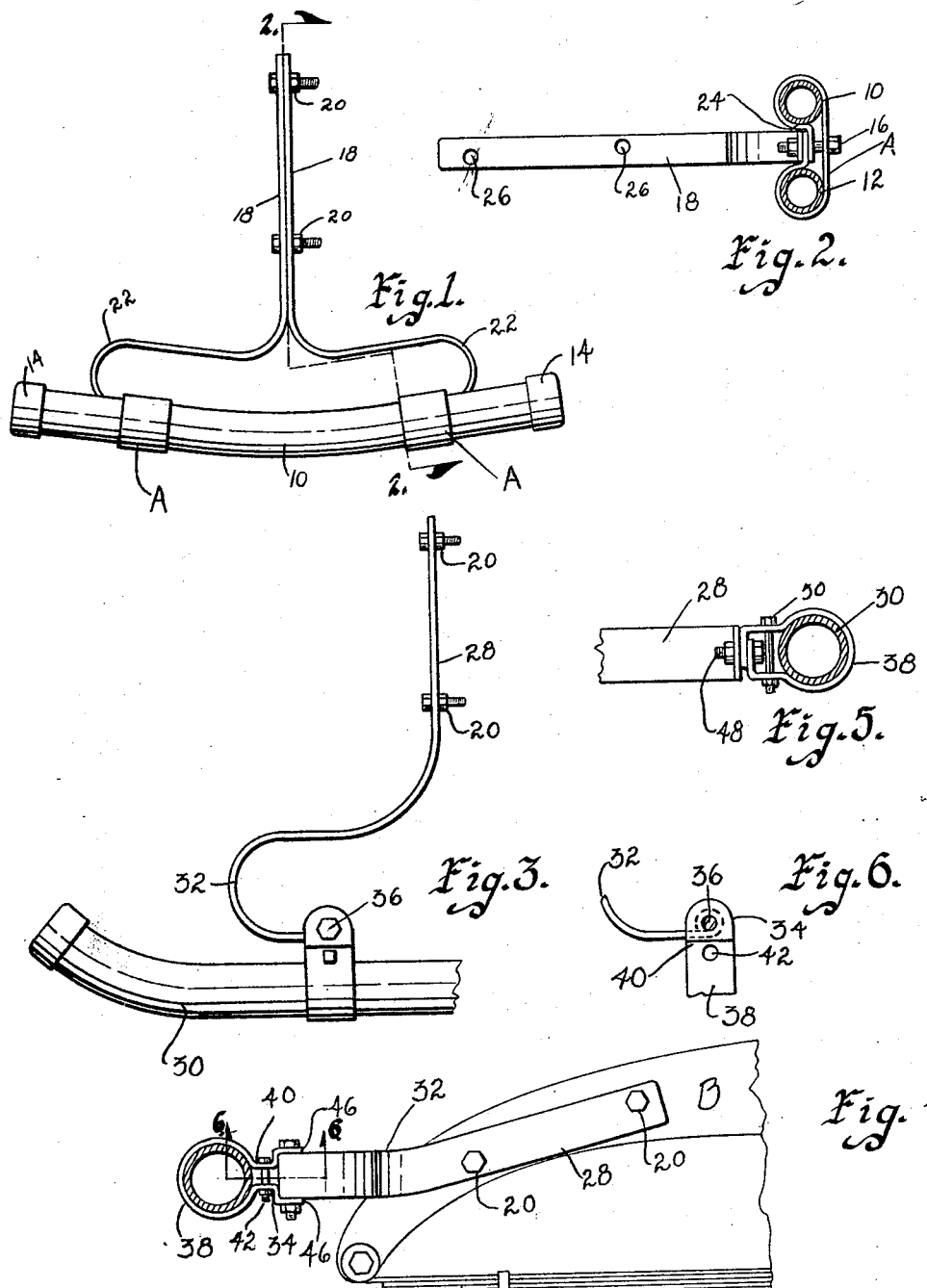

1,698,648

UNITED STATES PATENT OFFICE.

ALGOT W. NORDGREN AND GUSTAV A. BURANDT, OF ST. PAUL, MINNESOTA, ASSIGNORS TO MARQUETTE MANUFACTURING COMPANY, OF ST. PAUL, MINNESOTA.

BUMPER FASTENING.

Application filed August 18, 1927. Serial No. 213,820.

The object of our invention is to provide a bumper fastening of simple, durable and comparatively inexpensive construction.

More particularly it is our object to provide a bumper fastening wherein the fastening member or support may be used for connecting front bumper bars to an automobile or may be equally as well used for connecting quarter section bumper bars to the rear of an automobile.

With these and other objects in view, our invention consists in the construction, arrangement and combination of the various parts of our bumper construction, whereby the objects contemplated are attained, as hereinafter more fully set forth, pointed out in our claims and illustrated in the accompanying drawings, in which:

Figure 1 is a top plan view of our improved bumper fastening shown in use with tubular bumper members of the quarter section type.

Figure 2 is a sectional view taken on the line 2—2 of Figure 1.

Figure 3 is a top plan view of our bumper fastening of the type used for front bumper bars.

Figure 4 shows the front bumper mounted upon the frame of an automobile with the tubular bumper member shown in section.

Figure 5 is a detail sectional view showing one form of fastening for connecting the bumper element to its support; and Figure 6 is a detail sectional view taken on the line 6—6 of Figure 4.

In the accompanying drawings, we have used the reference numerals 10 and 12 to indicate a pair of vertically spaced tubular bumper elements of substantially quarter length, that is, of such length as to serve as a fender guard and to project just rearwardly of the rear fenders of an automobile and protect them.

The bumper elements are mounted in pairs so that the two rear fenders are protected and the space in between the bumper elements, left open for gaining access to the spare tire and to the rear of the automobile. The bumper elements which are tubular in form have caps 14 mounted upon each end.

The two bumper elements 10 and 12 are connected together by a fitting A. The fitting A serves two purposes in that, it serves to support and connect the two bumper elements together in spaced relationship and at the same time, serves as a means of connection between the bumper elements and the bumper support.

The fitting A is strap like and has one end curved around the bumper element 10 and has its other end curved around the bumper element 12. The two ends of the strap like member of the fitting A, lap over each other and are formed with a pair of aligned openings through which the bolt connection 16 extends. The bolt 16 also extends through an opening substantially centrally located in the fitting A.

In order to support the bumper elements 10 and 12 upon the rear end of an automobile, we provide a pair of substantially similar opposed supports 18. The supports 18 include a relatively long shank which is arranged parallel to the longitudinal axis of the automobile and rests against the longitudinal frame member of the automobile.

The relatively long straight portions of the supports 18 are formed with bolt openings for receiving bolts or the like 20 which serve as a means of connection between the two similar supports 18 and serve to mount them upon the longitudinal frame of the automobile.

Each of the supports 18 includes a curved portion 22 having one end arranged substantially against the overlapping ends of the strap like member of the fitting A. The bolt connection 16 projects through the ends of the supports 18 and thus the bumper elements are mounted upon the two supports 18.

The curved portion of the supports 18 as at 22, serves to cushion any shock which may be imparted against the bumper elements 10 and 12. A single bolt connection serves to positively and rigidly hold the bumper elements to each of the fittings 18.

It will be noted that the bumper elements are positioned above and below the outer ends of the supports 18 and that the curved portion of the fitting A projects above and below the ends of each support 18. When each support is fastened to the fitting A by means of the connection or bolt 16, then such support is practically held against any pivotal movement by virtue of the curved portions as at 24, of the fittings themselves.

The bolts 20 which fasten the two straight portions of the supports 18 together, project through openings 26. In figure 3 of the drawings, we have shown a support 28 substantially the same shape as each of the supports 18. A single support is used at each end of a bumper bar 30 which serves as a front bumper.

The forward end of the support 28 is curved as at 32 corresponding to the curve 22 of the support 18. The extreme forward and free end of the bumper support 28 is curved so as to form an eye 34 for receiving a bolt 36. The bumper bar or tube 30 has a loop like fitting 38 extending therearound which is contracted as at 40 for receiving the bolt 42.

The contracted portion when connected together or clamped together by the bolt 42, causes the bumper bar to be frictionally retained within the fitting 38. The ends of the fitting 38 provide a pair of spaced ears 46 which are provided with aligned openings for receiving the bolt 36. The curved end or the eye end 34 of the support 28, is received between the two ears 46 and when the bolt 36 is in place, the bumper bar is pivotally connected to the support 28.

Bolts 20 project through the support 28 and through openings formed in the automobile frame B. In Figure 5 of the drawings, we have shown a slightly modified form of connection between the bumper bar 30 and the support 28. In this case the ends of the fitting 38 lap over each other and a bolt 48 is used for connecting the two lapped over ends together and for projecting through one end of the support 28.

The end of the support 28 as shown in Figure 5, is exactly like the end of the support 18 shown in Figure 2 of the drawings. A clamp bolt 50 as shown in Figure 5 of the drawings, is used for retaining the loop fitting 38 around the bumper bar 30.

It will thus be noted that our bumper supports are universal in that two of them can be used oppositely fixed for mounting a bumperette or quarter bumper on the rear end of the automobile or two of them can be used oppositely facing at a considerable distance apart for connecting a long front bumper bar to the two longitudinal side members of the frame of the automobile.

The fact that the bumper supports first have a straight portion that fastens against the automobile frame and then have a portion projecting away from the frame and then curved as at 22 and 32 of the bumper supports 18 and 28, is of material advantage for cushioning and resisting a shock which may be imparted against the bumper bars.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. A bumper comprising a tubular bumper element, a pair of oppositely facing supports therefor, each support having a straight portion and a curved portion extending away from the straight portion towards the end of said bumper element, the free end of one of said curved portions extending towards the free end of the other of said curved portions, and means of connection between said free ends and the bumper element adjacent its ends, said means comprising split rings adjustable on said bumper element and normally clamped thereto, the free ends of said split rings being bolted to the free ends of said supports.

2. A bumper comprising a tubular bumper element, a pair of oppositely facing supports each connected at one end to said bumper element, the means of connection comprising split rings longitundinally adjustable on said bumper element, bolts associated with said split rings for clamping them on the bumper element and a second bolt on each split ring for fastening them to the free ends of the supports.

August 4, 1927, Des Moines, Iowa.

ALGOT W. NORDGREN.
GUSTAV A. BURANDT.